No. 760,255. PATENTED MAY 17, 1904.
A. M. & E. F. ROY.
BREAD OR CAKE KNIFE.
APPLICATION FILED DEC. 1, 1903.
NO MODEL.
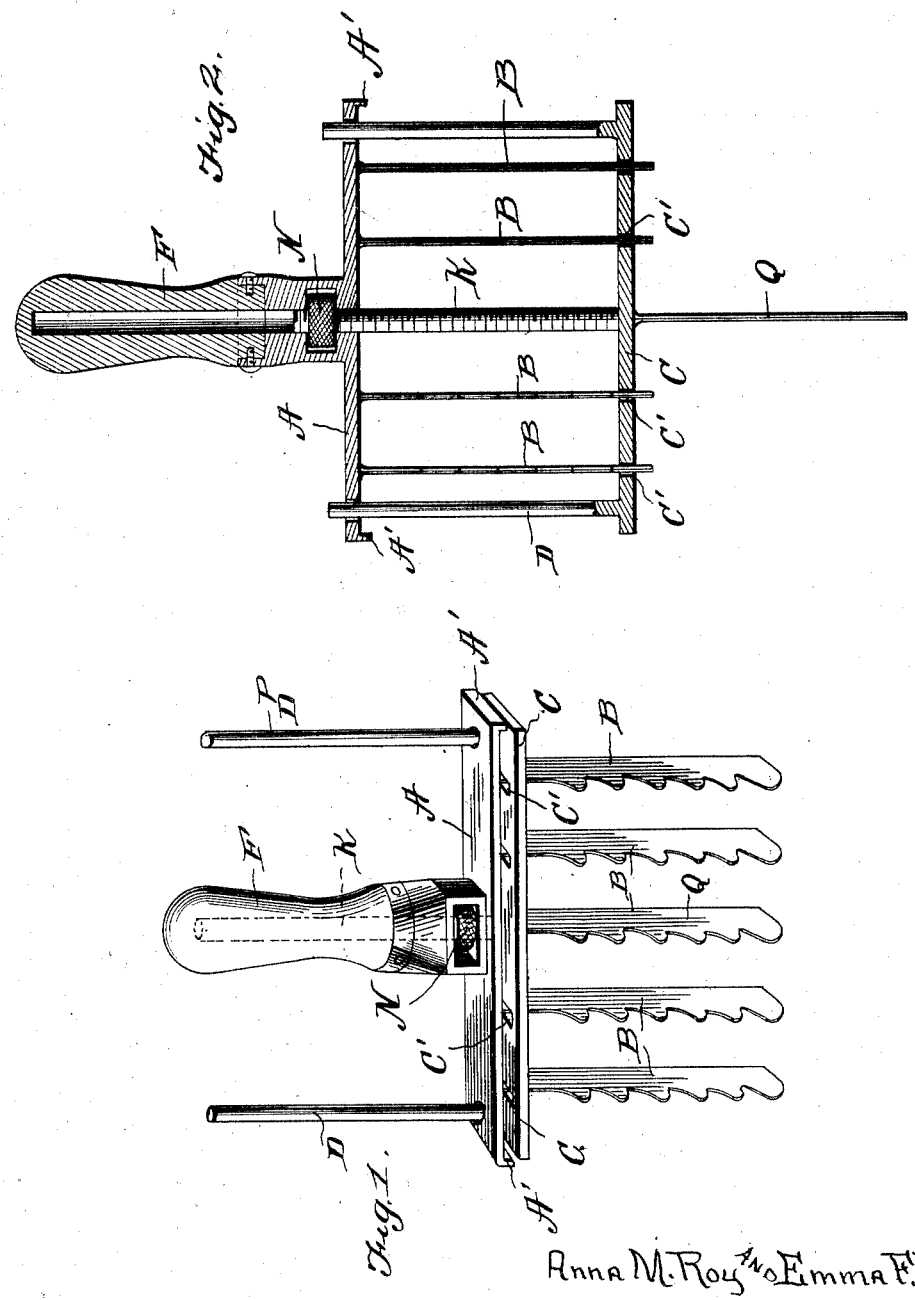

No. 760,255. Patented May 17, 1904.

UNITED STATES PATENT OFFICE.

ANNA M. ROY AND EMMA F. ROY, OF PITTSBURG, PENNSYLVANIA.

BREAD OR CAKE KNIFE.

SPECIFICATION forming part of Letters Patent No. 760,255, dated May 17, 1904.

Application filed December 1, 1903. Serial No. 183,401. (No model.)

*To all whom it may concern:*

Be it known that we, ANNA M. ROY and EMMA F. ROY, citizens of the United States, residing at Pittsburg, in the county of Allegheny and State of Pennsylvania, have invented certain new and useful Improvements in Bread or Cake Knives; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in bread and cake cutting knives; and the object of the invention is to produce a knife which may be used for cutting a plurality of slices or may be adjusted to use a single cutting-blade.

The invention consists in various details of constructions and arrangements of parts, which will be hereinafter fully described and then specifically defined in the appended claims.

Our invention is illustrated in the accompanying drawings, in which—

Figure 1 is a perspective view of our improved bread and cake cutting knife shown adjusted to cut several slices at once. Fig. 2 is a sectional view through the knife adjusted for use of a single cutting-blade only.

Reference now being had to the details of the drawings by letter, A designates a plate, preferably of metal, which has projecting from one face thereof cutting-blades B, which may be of any desired shape adapted for the purpose. These blades may be detachably held to the plate and fastened thereto in any suitable manner.

C designates a guard-plate having a series of transverse slots C' therein, adapted to receive the blades B, which are guided through said slots as the plate C is moved toward or away from the plate A. The plate C has rods or wires D secured thereto, and said rods D pass through apertures in the plate A and serve as guides as the plates are thrown together or away from each other. The ends of the plate A are turned at an angle, as at A', and are adapted to engage over the ends of the plate C when the plates are brought together.

A suitable handle F is provided, which may be either integral with or fastened to the plate A and has a central aperture therein to receive a threaded screw K, which is secured at one end to the plate C. An adjusting-nut N is mounted upon the threaded portion of said screw and has a play in a chambered or recessed portion of the central aperture in the handle. The portions of the handle adjacent to the screw are cut away, as shown in Fig. 1, in order to allow the thumb and finger of an operator to turn the nut when it is desired to adjust the device for cutting several slices or one, as the case may be.

The plate C has a centrally-projecting rigid blade Q, which is adapted to be used singly when the plate C is extended in the position shown in Fig. 2.

The operation of our device is simple, and it may be adjusted, as will be readily understood, by simply turning the nut N in one direction or the other to cause the plate A, carrying the knives, to be adjusted as shown in Figs. 1 and 2.

While we have shown a particular detailed construction of device illustrating our invention, it will be understood that we may make alterations, if desired, as to certain details of construction without in any way departing from the spirit of the invention.

Having thus described our invention, what we claim, and desire to secure by Letters Patent, is—

1. A bread or cake cutting knife comprising a plate with suitable handle, cutting-blades projecting from one face of said plate and spaced apart, a guard-plate having slots through which said blades pass, a screw fixed to the guard-plate and passing into the handle, a nut carried by the latter and engaging said screw, a single blade fixed to said guard-plate projecting therefrom.

2. A bread or cake cutting knife comprising a plate with suitable handle, cutting-blades projecting from one face of said handle and spaced apart, a guard-plate, a single blade centrally mounted thereon and projecting from its outer face, guide-rods to said guard-plate passing through said plate with the handle, and means for moving said extensible plate to and from said handle-plate whereby the blade upon the extensible plate may be used singly or with the other blades when the guard-plate is moved toward the handle, as set forth.

3. A bread-knife comprising a plate with a handle, a series of blades projecting from one face of said plate and spaced apart, a slotted guard-plate, a single blade extending centrally from the outer face of said guard-plate, guide-rods carried by the latter and working through apertures in the handle-carrying plate, a threaded rod secured to the guard-plate and having a play in a chambered portion of the handle, and a nut carried by the handle and engaging said screw, as set forth.

4. A bread-knife comprising a fixed plate with angled ends and a handle, blades projecting from one face of said plate, a nut mounted in an aperture in said handle, a guard-plate, a blade projecting centrally from the outer face of said guard-plate, rods integral with the end portions of the latter plate passing through apertures in the handle-carrying plate, a screw projecting from said guard-plate and extending into said handle and through said nut, said angled ends of the handle-plate adapted to engage over the ends of the guide-plate, as set forth.

In testimony whereof we hereunto affix our signatures in presence of two witnesses.

ANNA M. ROY.
EMMA F. ROY.

Witnesses:
 NOAH BUTLER,
 GEO. TIBBS.